L. H. DYER.
POWER PLANT.
APPLICATION FILED MAR. 14, 1916.
1,339,177. Patented May 4, 1920.
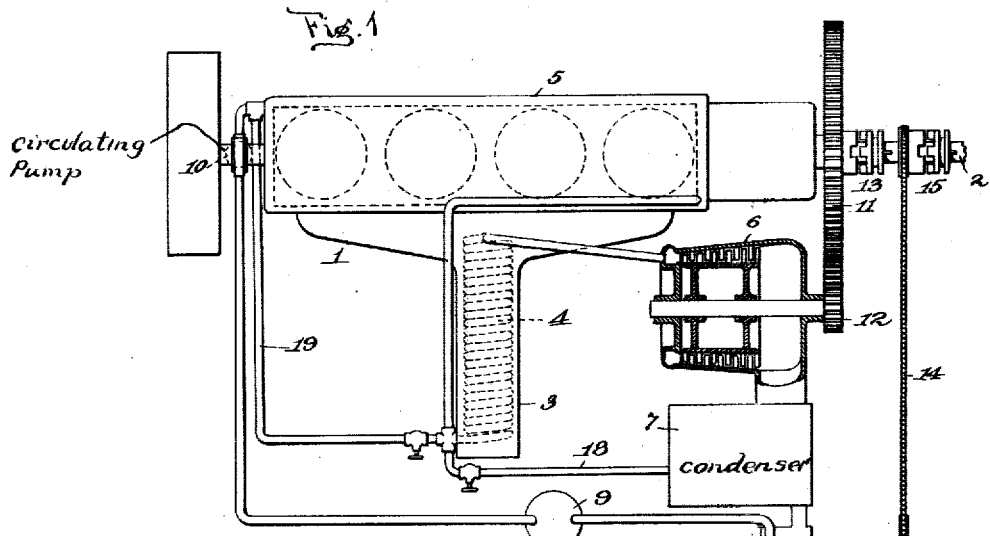
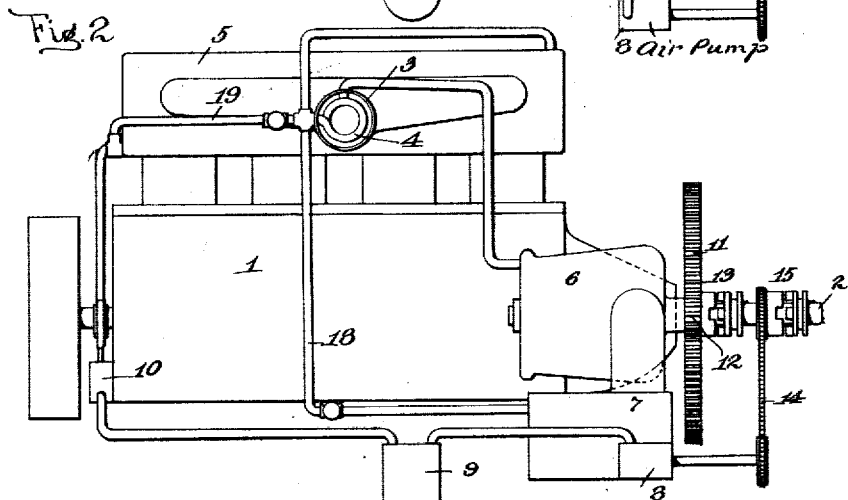
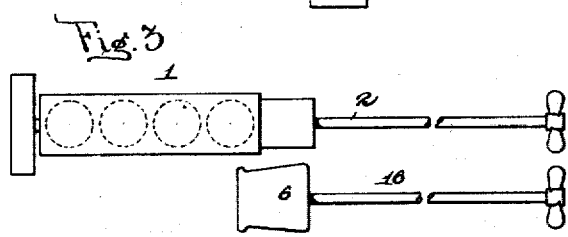
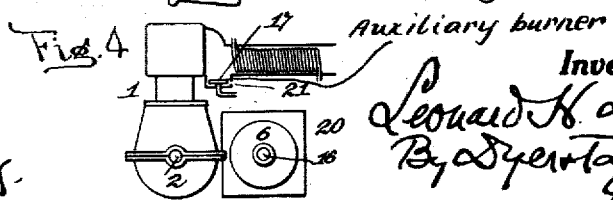

UNITED STATES PATENT OFFICE.

LEONARD H. DYER, OF GREENWICH, CONNECTICUT.

POWER PLANT.

1,339,177.  Specification of Letters Patent.  Patented May 4, 1920.

Application filed March 14, 1916. Serial No. 84,035.

*To all whom it may concern:*

Be it known that I, LEONARD H. DYER, a citizen of the United States, residing in Greenwich, Fairfield county, Connecticut, have invented a certain new and useful Improvement in Power Plants, of which the following is a specification.

This invention relates to improvements in power plants, utilizing internal combustion engines, and has for its object to increase the efficiency thereof. This and further objects will more fully appear from the following specification and accompanying drawings, considered together or separately.

In the drawings,

Figure 1 is a plan view of mechanism embodying my invention;

Fig. 2 is a side elevation of the same;

Fig. 3 is a plan view of a modification, the parts being shown disconnected; and Fig. 4 is an end view of another modification.

In all of the views like parts are designated by the same reference characters.

The internal combustion engine 1 may be of any type, and operate upon any principle. It may be irreversible, reversible, or have reversing gearing, as is usual. It is provided with a usual shaft 2, which is connected to the means for utilizing the power of the engine. For example, in a marine installation a screw propeller may be connected to the shaft 2. Associated with the exhaust passage, or manifold 3 of the engine 1 is a generator 4. This generator is shown in the form of a coil through the center of which, as well as the outside walls, the exhaust gases may pass. This form of generator is chosen solely for the purposes of illustration, as any kind of steam generator or boiler may be employed which will be acted upon by the exhaust gases from the engine.

In connection with the internal combustion engine is the usual water cooling system 5. This may be in the form of a jacket or jackets surrounding the whole or part of the cylinders, cylinder heads, etc. The purpose is to absorb heat from the engine by means of water. Associated with the devices hereinbefore described is a steam engine 6. This engine is connected by suitable piping to the generator 4, so that it is operated by means of steam raised in the generator. Any form of steam engine may be employed, but I prefer to use a steam turbine so designed as to operate upon low pressure steam. This engine may exhaust into the atmosphere, but I prefer to employ a condenser 7 and an air pump 8. By this means the steam engine will operate largely in vacuum and its efficiency will be increased. From the condenser 7 the water of condensation may be collected in the hot well 9, and from thence return to the water cooling system by means of the circulating pump 10. The size of the generator, the shape of the water cooling system, and the proportions of the parts should be calculated so that all of the water passing through the cooling system will be evaporated. If in particular installations, owing to the manner in which the internal combustion engine is operated, or for other reasons, there is not sufficient heat for vaporizing all of the water, an auxiliary burner 17, preferably with an inlet 21 for the introduction of air to support combustion, as shown in Fig. 4, may be employed for imparting additional heat to the generator. If desired, part of the circulating water may be by-passed from the water cooling system into the condenser by means of the pipe 18, provided with a suitable valve, as shown. In some cases it may be desirable to supply a greater amount of water than passes through the water cooling system, and in this event the pipe 19 may be employed, as shown in Fig. 1, such pipe being provided with a suitable valve, as shown.

The steam engine may be connected to any source of work. For example, as shown in Fig. 4, it may be connected to suitable auxiliary machinery, shown diagrammatically at 20. It may be connected to a separate screw propeller 16, as shown in Fig. 3. I prefer, however, to connect it to the main shaft 2, preferably through suitable gearing. This gearing may comprise a gear wheel 11 connected to the shaft 2, and a pinion 12 connected to the shaft of the steam engine. By properly proportioning the sizes of the gear wheel and pinion the steam engine may rotate at its most efficient speed. Preferably a clutch 13 is employed, so that the steam engine may be disconnected when desired. The air pump is operated by any suitable means, such as the chain 14 and clutch 15. By means of the mechanism illustrated after the internal combustion engine has been started, but before the water in the cooling system has been sufficiently heated to be evaporated by means of the generator 4 through the agency of the exhaust gases, the steam engine may be disconnected. The air pump, however, may be connected so that a vacuum will be produced in the condenser, and therefore steam will be generated at a lower pressure than would otherwise be the case if no vacuum were present. When steam is flowing through the steam engine the latter may be connected to drive the shaft 2 by application to the clutch 13. The details may be varied, as desired, to suit conditions.

In accordance with the provisions of the patent statutes, I have described the principles of my invention, together with the apparatus which I now consider to represent the best embodiment thereof; but I desire to have it understood that the apparatus shown is merely illustrative, and that the invention may be carried out in other ways.

Having now described my invention, what I claim as new and desire to secure by Letters Patent, is:—

1. A power plant, comprising an internal combustion engine, a steam generator associated with the exhaust thereof, and adapted to absorb heat from the exhaust gases of said engine, a steam turbine, actuated by the steam thereby produced, a condenser associated with the turbine, and an air pump associated with the condenser, and adapted to produce a vacuum in the said condenser, means operated independently of the steam turbine for actuating the air pump, whereby the necessary vacuum can be made in the condenser, irrespective of the operation of the turbine.

2. A power plant, comprising an internal combustion engine, a steam generator associated with the exhaust thereof, and adapted to absorb heat from the exhaust gases of said engine, a steam turbine, actuated by the steam thereby produced, a condenser associated with the turbine and an air pump associated with the condenser, and adapted to produce a vacuum in the said condenser, means operated by the internal combustion engine for actuating the air pump, whereby the necessary vacuum can be made in the condenser, irrespective of the operation of the turbine.

This specification signed and witnessed this thirteenth day of March, 1916.

LEONARD H. DYER.

Witnesses:
 BERNARD CLANCEY,
 JNO. ROB'T TAYLOR.